INVENTORS
GEORGE H. SPARKS
EDWARD FISCHER
BY
*Olsen and Stephenson*
ATTORNEYS

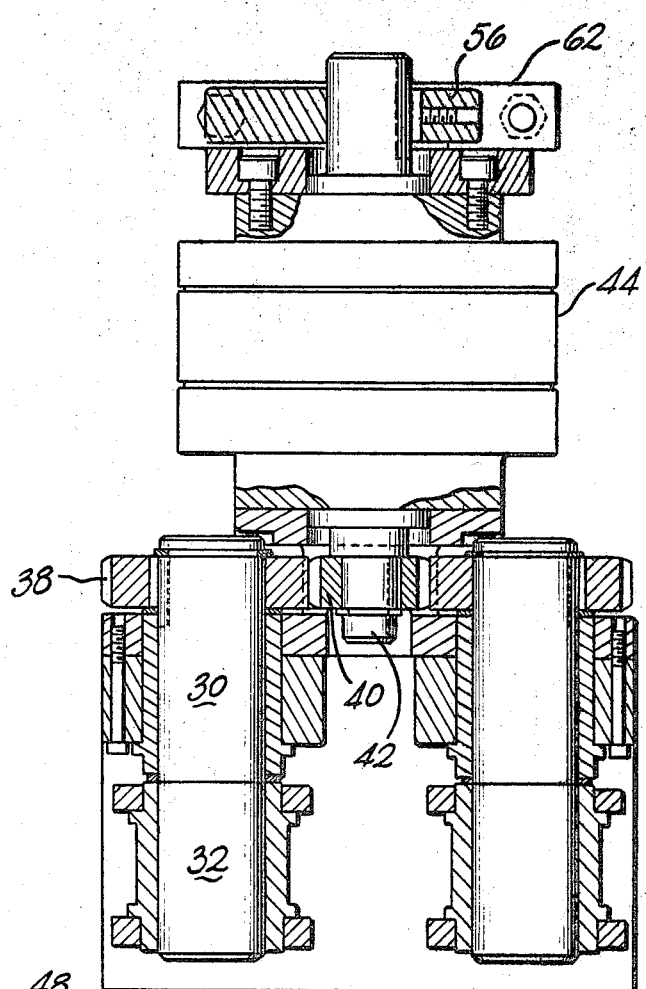
FIG. 3
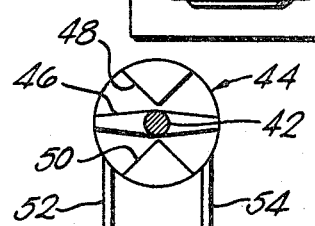
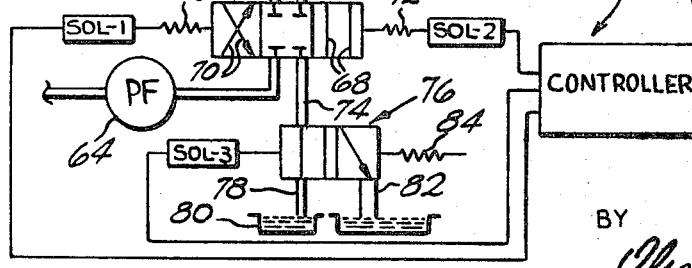
FIG. 5
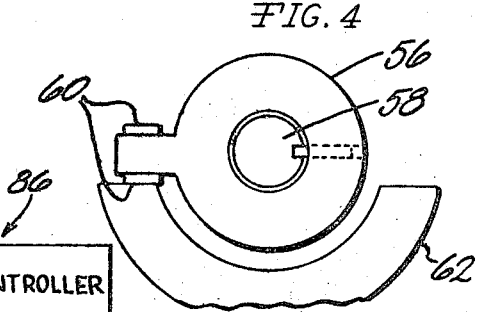
FIG. 4
INVENTORS
GEORGE H. SPARKS
EDWARD FISCHER
BY
*Olsen and Stephenson*
ATTORNEYS

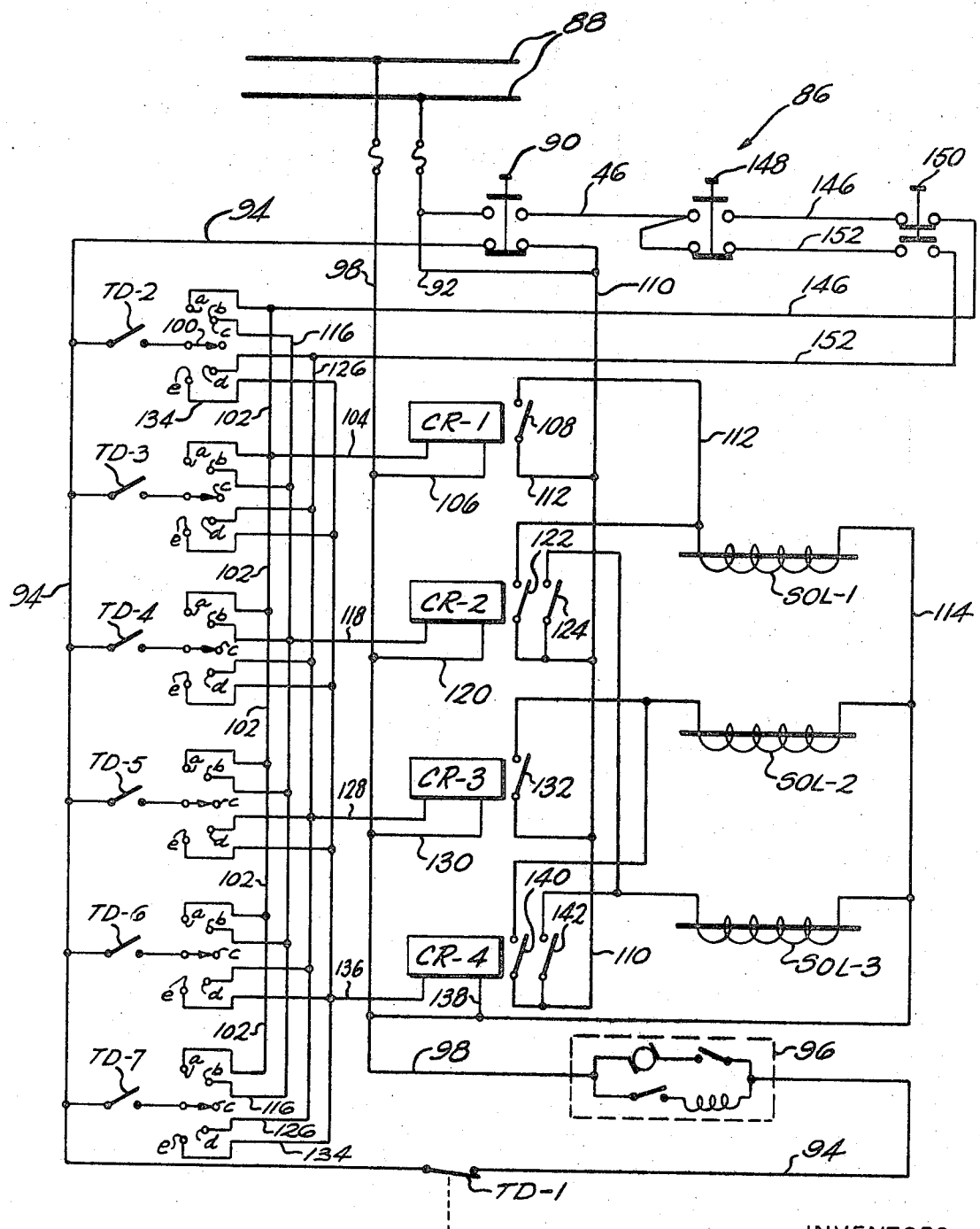

United States Patent Office 3,564,653
Patented Feb. 23, 1971

3,564,653
VARIABLE EXTRUSION APPARATUS
George H. Sparks, Dansville, and Edward Fischer, Saline, Mich., assignors, by mesne assignments, to Haskon, Inc., a corporation of Delaware
Filed Aug. 23, 1967, Ser. No. 662,631
Int. Cl. B29d 23/04
U.S. Cl. 18—14
9 Claims

ABSTRACT OF THE DISCLOSURE

Apparatus for blow molding hollow plastic articles which includes an extrusion head having a die and a mandrel defining an annular extrusion orifice. The mandrel is axially shiftable relative to the die so that the cross section of the orifice can be varied to vary the cross section of the tube. Shifting of the mandrel is automatically controlled so that in each cycle of operation of the blow molding machine a programmed movement of the mandrel occurs to provide optimum wall thickness of the extruded tube for blowing the desired article.

BRIEF SUMMARY OF THE INVENTION

The present invention relates to improvements in apparatus for blow molding plastic articles, and particularly to automatic programming apparatus for varying the wall thickness of an extruded tube.

It is conventional practice to shift a mandrel relative to an annular die member in a die head for the purpose of changing the wall thickness of the extruded plastic tube which is to be blown to the shape of the finished plastic article. Also, various arrangements have been proposed for programming the movement of the mandrel relative to the moulding cycle of the machine, but the developments that have been made to date leave much to be desired.

One of the conventional arrangements found in the prior art for shifting the mandrel utilizes a hydraulic actuated piston for pivoting a lever, one end of which shifts the mandrel. Similarly, the hydraulically actuated piston may be connected directly to the mandrel for shifting the mandrel. Both of these arrangements leave much to be desired from the standpoint of precision. Any irregularity in functioning of the hydraulic piston is directly or nearly directly transmitted to the mandrel. This necessarily follows because when the piston is directly connected to the mandrel, no mechanical advantage occurs and the mandrel moves the same as the piston, while in those instances where a lever is employed, the mechanical advantage necessarily is small because of the need for economy of space which prohibits use of a long lever.

With these defects of the prior art in mind, it is one of the objects of the present invention to provide an arrangement for varying the wall thickness of an extruded tube wherein a large mechanical advantage exists between the mandrel and a fluid activated mechanism for shifting the mandrel, whereby any irregularity in movement of a piston, vane or the like of the mechanism will be minimized to an inconsequential amount when transmitted to the mandrel.

According to one form of the present invention an extrusion apparatus is provided having an extrusion head including a die member and a mandrel member defining an annular extrusion orifice, the mandrel member being shiftable relative to the die member so that the cross section of the orifice can be varied to vary the cross section of the tube. An actuator assembly is provided for shifting the mandrel member comprising an eccentric shaft mounted normal to an extension of the axis of said mandrel member, and a link is connected between the eccentric and the mandrel to import axial movement to the mandrel when the eccentric is rotated on the shaft axis. Hydraulic transmission means are coupled to the shaft for transmitting torque thereto, and by virtue of the large mechanical advantage between the moving element of the transmission means and the mandrel, irregularities in initiating and stopping movement of the moving element are essentially eliminated with respect to the movements that occur at the mandrel.

Another disadvantage of the prior art devices in this field is the lack of versatility that exists in setting them readily for making a variety of different articles. This lack of flexibility materially limits the machine in making a variety of different blown articles wherein maximum efficiency is realized in each instance in the use of raw materials. This is a significant defect of the prior art devices, because in many instances it results in excessive use of raw materials, and this becomes quite important when it is kept in mind that the cost of the raw materials is a large portion of the final cost of each blown plastic article.

According to one form of the present invention a program actuator assembly is provided for selectively holding or shifting the mandrel which comprises first and second means for shifting said mandrel at predetermined rates in opposite directions and third and fourth means for shifting the mandrel at more rapid rates in opposite directions, and timer means are provided for selectively holding the mandrel or for selectively shifting the mandrel by any of the first, second, third or fourth means in programmed sequence and for desired time periods. This is all accomplished merely by setting a series of five-way switches, each of which has a timer associated with it which also can be set to a desired time. Such switches will then be energized sequentially for the time period to which the associated timer is set.

Other objects of this invention will appear in the following description and appended claims, reference being had to the accompanying drawings forming a part of this specification wherein like reference characters designate corresponding parts in the several views.

BRIEF DESCRIPTION OF THE DRAWING

FIG. 3 is a fragmentary horizontal section of the program actuator assembly, taken on the line 3—3 of FIG. 1;

FIG. 4 is a fragmentary rear elevation of the program actuator assembly;

FIG. 5 is a schematic diagram of the hydraulic circuits of the illustrated embodiment of the invention; and FIG. 6 is a schematic diagram of the electrical circuits of the illustrated embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION OF THE INVENTION

Attention is directed first to FIGS. 1–4, inclusive, for a general description of the illustrated portions of the blow molding machine and the program actuator assembly mounted thereon. In the illustrated embodiment of the invention, a blow molding machine having dual extrusion die heads is shown, but it will be understood that the present invention can be employed with a single die head equally as well. For the purposes of description, only one of the die heads and its associated parts will be described, it being understood that both of the die heads are constructed substantially identically the same.

Figure 1:
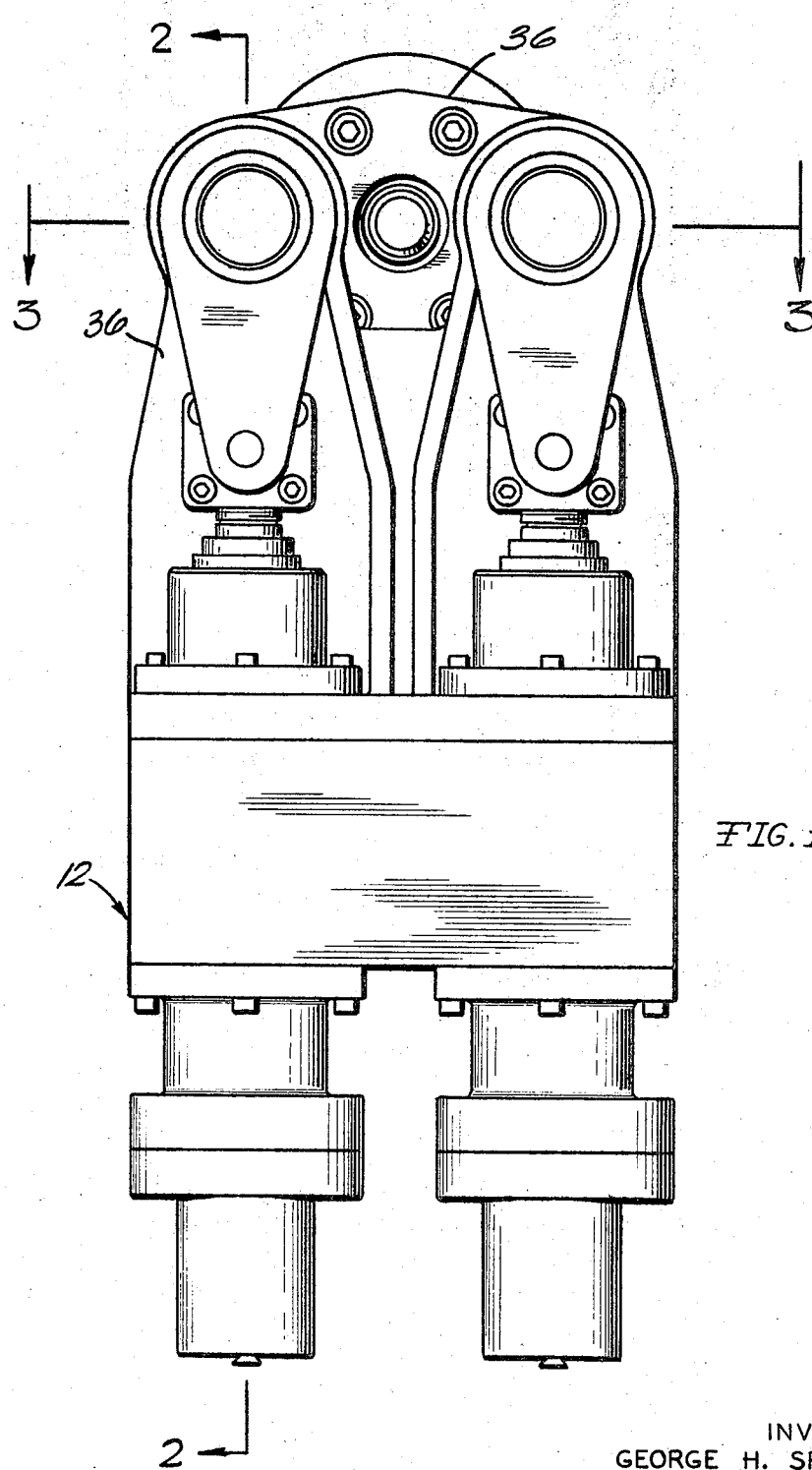
FIG. 1 is a fragmentary front elevation of a blow molding machine utilizing the variable extrusion apparatus of the present invention.
Figure 2:
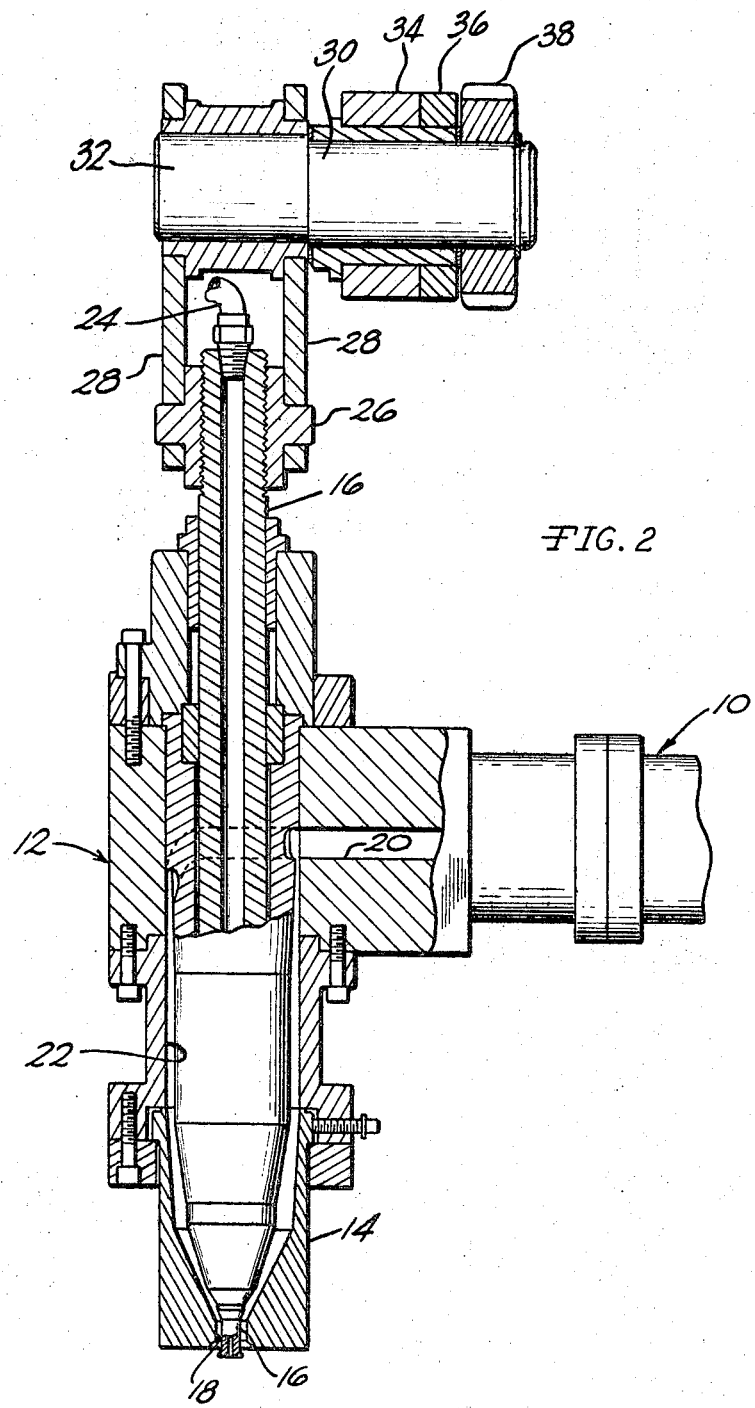
FIG. 2 is a fragmentary vertical sectional view of the die head and associated parts, taken on the line 2—2 of FIG. 1.

As shown in FIG. 2, an extruder 10 has mounted on its forward end an extrusion die head 12, the lower end of which carries the die member 14. Positioned within the die head 12 for axial movement is the mandrel member 16, which together with the die member 14 defines an annular orifice 18 through which plastic material can be extruded. The mandrel 16 has a varied cross section so that shifting of the mandrel 16 relative to the die member 14 will vary the effective cross section of the annular orifice 18, whereby the wall thickness of the extruded plastic tube can be varied. The plastic material from the extruder 10 is delivered to the annular orifice 18 in the conventional manner through the passageway 20 and the annular passageway 22 in the die head 12. In the illustrated embodiment of the invention the mandrel 16 is shown as being shiftable relative to the die member 14, but it will be understood that the present invention also extends to arrangements wherein the mandrel 16 is stationary and the surrounding die member is shiftable for the purpose of varying the effective cross section of the orifice 18. The mandrel 16 is also shown being connected to a source of air at 24 for the purpose of introducing air into an article to be blow molded, but it will be understood that the present invention also extends to arrangements wherein the extruded tube is transferred to a separate blowing station at which the blowing operation occurs.

The structures defined above in the immediately preceding paragraph are conventional in the art, and the improvements comprising the present invention will now be described. As best shown in FIG. 2, a trunnion member 26 is threadedly connected to the upper end of the mandrel 16, and links 28 are pivotally connected thereto. Supported above the mandrel 16 is an eccentric shaft 30 which has its eccentric 32 in general alignment above the mandrel 16 and supports the links 28. The eccentric shaft 30 is supported on the brackets 34 and 36, which are supported rigidly on the blow molding machine, so that when the shaft 30 is rotated, the eccentric 32 will impart shifting movement to the mandrel 16 through the links 28. Rotational movemeent is imparted to the eccentric shaft 30 through the gear 38 which is keyed thereon and which is in mesh with the gear 40, which in turn is keyed to the output shaft 42 of the hydraulically driven vane-type reciprocating torque actuator 44. Thus, when the torque actuator 44 rotates the shaft 42, the gear 40 will turn the gear 38 a limited extent thereby turning the shaft 30 and the eccentric 32 will effect limited movement of the mandrel 16. Should it be desired, shaft 30 can be removed and replaced by another shaft having different eccentric dimensions.

The hydraulically driven vane-type reciprocating torque actuator 44 is shown schematically in FIG. 5 where it can be seen that the shaft 42 carries a double-vane 46 which is adapted to reciprocate between the stops 48 and 50. Hydraulic fluid can be introduced through conduits or lines 52 or 54 into the chambers within the actuator 44 to effect rotation of the vane 46 in either direction. As will be described presently, if fluid is introduced through line 52 to effect rotation of the double vane in a clockwise direction, the line 54 will serve as a discharge line for the hydraulic fluid on the exhaust side of the vane, and the back pressure exerted against the vane will be utilized to control the rate at which the actuator 44 rotates the shaft 42 and thereby to control the rate of movement of the mandrel 16.

If desired, a limit stop can also be positioned externally of the hydraulic actuator 44, and one such arrangement can be seen best in FIGS. 3 and 4. As there shown, a limit stop member 56 is keyed to the shaft 58 so that the limit stops 60 can abut against the yoke 62 which is rigidly mounted on the blow molding machine.

Attention is now directed to FIG. 5 for a description of the hydraulic circuit employed in connection with the present invention. A conventional hydraulic pump 64 is provided for pumping hydraulic fluid through the valve 66 to the torque actuator 44. When the valve is in the position shown in FIG. 5, the ports to the conduits 52 and 54 are closed, and consequently, fluid cannot pass to the actuator. Under this condition, the mandrel 16 will remain stationary. When it is desired to supply hydraulic fluid under pressure to actuator 44 so as to turn the vane 46 in a clockwise direction, the valve 66 is shifted to the left, as seen in FIG. 5, thereby opening passages 68 to lines 52 and 54. Similarly, when it is desired to rotate the vane 46 in a counterclockwise direction, the valve 66 is shifted to the right so as to open the passages 70 in reverse order to the supply and discharge lines 52 and 54. In the illustrated embodiment of the invention, the valve 66 is controlled by means of the solenoids SOL–1 and SOL–2. Solenoid SOL–1 functions to move the valve to the left, and solenoid SOL–2 functions to move the valve 66 to the right. When neither solenoid is energized, the springs 72 will function to maintain the valve in the neutral position of FIG. 5, whereby fluid will not be passed through the actuator 44, and in this condition, the mandrel 16 will be held stationary. When the solenoid SOL–1 is energized so as to cause the vane 46 to be turned in a clockwise direction the mandrel 16 will be shifted relative to the die 14 so as to increase the wall thickness of an extruded tube, and similarly, when it is desired to reduce the wall thickness of the extruded tube, the solenoid SOL–2 will be energized so as to cause the vane 46 to turn in a counterclockwise direction.

From the above description, it will be understood that when the pump 64 is in communication with either line or conduit 52 or 54, depending upon whether the valve 66 is shifted to the right or to the left, the other of the conduits 52 and 54 will then be in communication with the discharge conduit 74 which passes through the valve 76. When the latter is in the position shown in FIG. 5, the discharge fluid will pass through the restricted flow control duct 78 to the reservoir 80, thereby limiting the rate at which vane 46 can turn. If it is desired to increase the rate at which vane 46 can turn, this is accomplished as follows. For this purpose, the valve is shifted to the left so that the fluid will flow through the flow control duct 82 having a substantially larger capacity. It will be understood that the rate at which the vane 46 rotates is a function of the pressure of the fluid from the pump 64 acting on one side of the vane 46, and the back pressure of the fluid being discharged to reservoir 80, which back pressure will act on the opposite side of the vane 46. When it is desired to move the vane 46, and thereby the mandrel 16 at a relatively slow rate, the valve 76 will be retained in the position shown in FIG. 5, but when it is desired to move the vane 46 and thereby the mandrel 16 at a more rapid rate, the valve 76 will be moved to the left so that the back pressure will be lessened, thereby allowing a greater rate of turning of the vane 46. A solenoid SOL–3 is connected to the valve 76 so that when the solenoid SOL–3 is energized, the valve 76 will be moved to the left for increasing the rate of turning of the vane 46, and when the solenoid SOL–3 is de-energized, the spring 84 will function to return the valve to the normal position shown in FIG. 5.

As can be seen in FIG. 5, the solenoids SOL-1, SOL-2 and SOL-3 are electrically connected to the controller 86 which allows either manual or automatic operation of the hydraulic circuit. Attention is now directed to FIG. 6 for a description of the electric circuits associated with the controller 86. The controller 86 is electrically connected to a source of electrical supply 88 in the conventional manner. The electric circuits for automatic operation will be described first, after which the manual operation will be described. From this description it will be understood that the controller can be set so that in each cycle of operation of the blow molding machine, the movement or shifting of mandrel 16 can be fully and automatically programmed so that the desired wall thickness throughout the length of each parison or extruded tube will be realized. Thus, waste of plastic materials resulting from making certain sections of the walls of the finished article thicker than is necessary will be avoided. It will also be understood that the controller 86 can easily and readily be reset is articles of different design are to be blown so that the same high degree of efficiency in use of plastic raw materials can always be realized.

The primary function of the controller 86 is to control the operation of the valves 66 and 76 through the solenoids SOL-1, SOL-2 and SOL-3, which, as shown in FIG. 6, are part of the electric circuits associated with controller 86. When automatic operation of the program actuator assembly is desired, switch 90 will be in its normal position shown in FIG. 6, so that a circuit will be closed from source 88 through conductor 92, switch 90, conductor 94, normally closed time delay switch TD-1, conventional timer motor 96, and conductor 98. At this time solenoids SOL-1, SOL-2 and SOL-3 will remain de-energized because the switches associated with each of control relays CR-1, CR-2, CR-3 and CR-4 are open. Under these conditions, the parisons extruded from die head 12 would have wall thicknesses of a constant dimension. The arrangement for selecting which of the control relays is to be energized and the time for which each is energized will now be explained.

Associated with the timer motor 96 are a plurality of time delay switches TD-2, TD-3, TD-4, TD-5, TD-6 and TD-7 which are operable to close in sequence starting with switch TD-2. Each succeeding time delay switch will close when the preceding switch has timed out so that only one of the time delay switches will be closed at any given time. Each of these time delay switches is in a similar circuit, and therefore, only the circuit of time delay switch TD-2 will be explained in detail. Time delay switch TD-2 is in series with a manually set, five-way switch 100 which can be selectively closed with any of its associated contacts a, b, c, d, or e. It is shown closed with contact c which is not in a closed circuit so that when switch 100 is in the illustrated position and time delay switch TD-2 is closed, none of the solenoids will be energized, and consequently for the period of time that switch TD-2 is closed, the walls of the parison being extruded will remain the same dimension. Thus, until switch TD-2 has timed out, mandrel 16 will be held stationary if switch 100 is in the illustrated position c.

Assume now that switch 100 had been positioned in engagement with contact a. Then, during the period of time that switch TD-2 is closed, a circuit will be closed through conductor 94, switch TD-2, switch 100 and contact a, conductors 102 and 104, control relay CR-1, and conductors 106 and 108. Thus, control relay CR-1 will be energized closing its switch 108, whereby current can now flow through conductors 92, 110 and 112, solenoid SOL-1, conductor 114 to conductor 98. Energizing solenoid SOL-1 will therefore have the effect of moving the valve 66 to cause the wall thickness of the parison being extruded to increase until switch TD-2 has timed out.

In a similar manner, if switch 100 is closed across contact b, a current can flow through control relay CR-2 via conductors 116, 118 and 120 to close the switches 122 and 124 which will close circuits through solenoids SOL-1 and SOL-3 so as to cause the wall thickness of the parison being extruded to increase at a relatively faster rate until switch TD-2 has timed out.

Again, in a similar manner, if switch 100 is closed across contact d, a current can flow through control relay CR-3 via conductors 126, 128 and 130 to close the switch 132 which will close the circuit through solenoid SOL-2 so as to cause the wall thickness of the parison being extruded to decrease until switch TD-2 has timed out.

Similarly, if switch 100 is closed across contact e, a current can flow through control relay CR-4 via conductors 134, 136 and 138 to close the switches 140 and 142 which will close circuits through solenoids SOL-2 and SOL-3 so as to cause the wall thickness of the parison being extruded to decrease at a relatively faster rate until switch TD-2 has timed out.

Thus, switch 100 can be set manually in the position desired to carry out the first step desired in varying or holding the wall thickness of the parison for a time interval set for timing out of switch TD-2. Each of the succeeding time delay switches and their associated circuits, which are in electrical parallel with the circuit of switch TD-2, function the same as the circuits containing switch TD-2, but at progressively succeeding time intervals. Thus, a wide variety of changes can be made in the wall thickness of the extruded parison or the wall thickness can be held constant when desired.

It will be recognized that not all the time delay circuits will be used with the forming of any given article. Also, if necessary, more time delay circuits can be provided than are shown.

When forming any parison for a bottle or similar article, the necessary time delay circuits will be employed, with such circuits being timed to utilize the full normal time for extruding the parison. The cycle of operation of the time delay switches will then be restarted, preferably by a limit switch 144 arranged to be actuated by the operation of the blow molding machine. In the present instance the limit switch 144 is shown to be actuated by a reciprocating knife used to sever the upper end of the extruded parison when the latter has been confined between sections of a mold. In this arrangement, the time delay switch TD-1 is set to open at a selected time after the start of the timing cycle, and the closing of the switch TD-1 then restarts this timing cycle.

From the foregoing description, it will be understood that the program actuator assembly can be set to shift the mandrel 16 in either direction at a predetermined rate or at a more rapid rate than the predetermined rate. Also, the mandrel 16 can be held stationary. These shifting or holding steps can be carried out in sequence for a series of predetermined time intervals so that a parison can be extruded having various wall thickness, and the program actuator assembly can function repeatedly in timed relation with the cycle of operation of the blow molding machine.

The program actuator assembly can also be operated manually, when desired. When manual operation is to occur, the switch 90 is depressed bridging the contacts in conductor 146. Simultaneously, either switch 148 for increasing the wall thickness of the parison is depressed, or switch 150 for decreasing the wall thickness is depressed. In the first instance, a circuit is closed through conductor 146, conductor 102, control relay CR-1, and conductors 106 and 98, whereby solenoid SOL-1 will be energized to effect the desired movement of mandrel 16. In the second instance, a circuit is closed through conductors 146 to switch 148, conductors 152, 126, 128, control relay CR-3, and conductors 130 and 98 to effect energization of solenoid SOL-2 for effecting the desired shifting of mandrel 16 for decreasing the wall thickness of the extruded parison.

The manual features described are used primarily when it is desired to set the mandrel 16 at a stationary position for continuous blow molding operations when it is not necessary to alter the wall thickness of the extruded parison.

Having thus described our invention, we claim:

1. Extrusion apparatus having an extrusion head including a die member and a mandrel member defining an annular extrusion orifice, one of said members being shiftable relative to the other member and having a cross section varied relative to the other member so that the cross section of said orifice can be varied to vary the cross section of an extruded tube, and a program actuator assembly for shifting said member comprising an eccentric shaft mounted normal to an extension of the axis of said one member, means connected to said one member and the eccentric of said shaft for shifting said one member axially in response to rotary motion of said eccentric, transmission means coupled to said shaft for imparting rotary motion selectively in either direction to said shaft, first control means for actuating said transmission means for rotating said shaft a selected amount to change to a desired dimension the wall thickness of a tube being extruded from said extrusion head, and other control means for varying the rate of rotation of the shaft and thereby the rate of change of the wall thickness of such tube.

2. Extrusion apparatus according to claim 1, wherein said transmission means comprises a hydraulically driven vane-type reciprocating torque actuator.

3. Extrusion apparatus according to claim 2, wherein said first control means comprises a source of hydraulic liquid under pressure, and first valve means for directing the liquid under pressure selectively to either side of the vane of said actuator.

4. Extrusion apparatus according to claim 3, wherein said other control means comprises second valve means for varying the back pressure selectively of the liquid discharged from said actuator.

5. Extrusion apparatus according to claim 4, wherein an automatic controller is electrically connected to said first and second valve means for actuating such valve means in a programmed time sequence relative to a blow molding cycle of the extrusion apparatus.

6. Extrusion apparatus according to claim 1, wherein said eccentric shaft is adapted to be replaced by another eccentric shaft having an eccentric of different dimensions so as to vary the effective stroke of the one member.

7. Extrusion apparatus according to claim 1, wherein the extrusion apparatus has a plurality of extrusion heads, and said program actuator assembly includes a plurality of eccentric shafts, one associated with each extrusion head, and said transmission means is coupled to each of said shafts for imparting rotary motion simultaneously to each of said shafts.

8. Extrusion apparatus having an extrusion head including a die member and a mandrel member defining an annular extrusion orifice, one of said members being shiftable relative to the other member and having a cross section varied relative to the other member so that the cross section of said orifice can be varied to vary the cross section of an extruded tube, wherein the improvement comprises a program actuator assembly for selectively holding or shifting said one member comprising first means for shifting said one member at a predetermined rate in one direction, second means for shifting said one member at said predetermined rate in the other direction, third means for shifting said one member in said one direction at a relatively more rapid rate than said predetermined rate, fourth means for shifting said one member in said other direction at a relatively more rapid rate than said predetermined rate, and timer means for selectively holding said one member or for selectively shifting said one member by any of said first, second, third or fourth means in programmed sequence.

9. Extrusion apparatus according to claim 8, which includes means associated with cyclically operated molds for forming hollow articles from said extruded tube, and wherein said timer means is responsive to said means to initiate said programmed sequence in timed relation to the cycle of operation of said molds.

References Cited

UNITED STATES PATENTS

| | | |
|---|---|---|
| 2,793,598 | 5/1957 | Rivoche. |
| 3,186,032 | 6/1965 | Harwood _____ 18—14 |
| 3,217,360 | 11/1965 | Mason et al. _____ 18—14 |
| 3,218,672 | 11/1965 | Langecker _____ 18—14 |
| 3,358,329 | 12/1967 | Martin et al. _____ 18—14 |
| 3,314,107 | 4/1967 | Honstrater _____ 18—14X |

FOREIGN PATENTS 271,659  6/1963  Australia.

J. SPENCER OVERHOLSER, Primary Examiner

U.S. Cl. X.R.

18—5